(12) United States Patent
Yasui et al.

(10) Patent No.: US 6,350,204 B1
(45) Date of Patent: Feb. 26, 2002

(54) FIBER-REINFORCED PLASTIC PIPE

(75) Inventors: Yoshiharu Yasui; Yasuki Miyashita; Yasuya Mita, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/567,488

(22) Filed: May 9, 2000

(30) Foreign Application Priority Data

May 11, 1999 (JP) .............................. 11-130016

(51) Int. Cl.[7] .............................. F16C 3/00; B65H 81/00
(52) U.S. Cl. .................. 464/181; 156/172; 464/183
(58) Field of Search ................ 464/181, 179, 464/183, 182; 156/172, 173

(56) References Cited

U.S. PATENT DOCUMENTS

| | | | | |
|---|---|---|---|---|
| 4,089,190 A | * | 5/1978 | Worgan et al. | 464/181 |
| 4,171,626 A | * | 10/1979 | Yates et al. | 156/173 |
| 4,238,540 A | * | 12/1980 | Yates et al. | 428/36 |
| 4,248,062 A | * | 2/1981 | McLain et al. | 464/180 |
| 4,569,710 A | * | 2/1986 | Lambot et al. | 156/172 |
| 4,605,385 A | * | 8/1986 | Puck et al. | 464/181 |
| 4,664,644 A | * | 5/1987 | Kumata et al. | 464/180 |
| 4,863,416 A | * | 9/1989 | Gupta | 464/181 |
| 4,888,224 A | * | 12/1989 | Zackrisson et al. | 428/35.9 |
| 4,963,210 A | * | 10/1990 | Corr et al. | 156/172 |
| 5,061,533 A | * | 10/1991 | Gomi et al. | 428/36.3 |
| 5,110,644 A | * | 5/1992 | Sparks et al. | 428/36.3 |
| 5,222,915 A | * | 6/1993 | Petrzelka et al. | 464/181 |
| 5,288,109 A | * | 2/1994 | Auberon et al. | 285/149 |
| 5,342,464 A | * | 8/1994 | McIntire et al. | 156/172 |
| 5,683,300 A | * | 11/1997 | Yasui et al. | 464/181 |
| 5,836,825 A | * | 11/1998 | Yamane | 464/181 |
| 5,851,152 A | * | 12/1998 | Ilzhofer et al. | 464/181 |
| 6,240,971 B1 | * | 6/2001 | Monette et al. | 138/153 |

FOREIGN PATENT DOCUMENTS

| | | |
|---|---|---|
| JP | 08-108495 | 4/1996 |
| JP | 08-290487 | 11/1996 |

\* cited by examiner

*Primary Examiner*—Lynne H. Browne
*Assistant Examiner*—Kenn Thompson
(74) *Attorney, Agent, or Firm*—Morgan & Finnegan, LLP

(57) ABSTRACT

A fiber-reinforced plastic pipe has a joint section formed in one end. The joint section is coupled to another member. The pipe includes a helical layer formed with a fiber. The fiber is wound at a winding angle that is equal to or less than forty-five degrees. The fiber volume fraction of the joint section is lower than the fiber volume fraction of the remainder of the pipe.

14 Claims, 4 Drawing Sheets

FIBER-REINFORCED PLASTIC PIPE

BACKGROUND OF THE INVENTION

The present invention relates a fiber-reinforced plastic pipe the ends of which are fixed to couplers.

A typical method for manufacturing a fiber-reinforced plastic (FRP pipe) is a filament winding method. In this method, fibers are impregnated with resin and are wound about a mandrel. Thereafter, the resin is hardened. The strength of a pipe made by the filament winding method greatly depends on the winding angle and the arrangement of the wound fibers. The winding angle of a fiber refers to the angle defined by the fiber and the mandrel. If the winding angle is set equal to or smaller than forty-five degrees, the winding angle cannot be easily maintained and the fastening force of a fiber is weak. Also, the pitch between the turns of the fiber cannot be maintained at a predetermined value.

To manufacture a rigid FRP pipe, bundles of fine fibers are used. If the winding angle of a bundle is small, the bundle is relatively loosely wound about a mandrel. As a result, it is difficult to form a cylinder of a uniform thickness with the bundle. Also, air or too much resin may be trapped between the fibers. Further, to increase the rigidity of an FRP pipe, the ratio of the volume of the fibers to the entire volume of the FRP pipe, or the volume fraction, herein after referred to Vf, of the fibers, must be increased.

Japanese Unexamined Patent Publication No. 8-290487 discloses a filament winding method. In this method, a helical layer is formed about a mandrel. The helical layer includes a bundle of reinforcing fibers. The bundle is wound about the mandrel at a relatively small winding angle. A hoop layer is formed about the helical layer. The hoop layer includes a bundle of reinforcing fibers. The bundle of the hoop layer is wound about the helical layer at a relatively great winding angle. The fastening force of the hoop layer is greater than that of the helical layer. When the hoop layer is wound about the helical layer, voids in the helical layer are pushed to the exterior. Also, excessive resin in the reinforcing fibers in the helical layer is squeezed out, which increases the Vf.

A propeller shaft made of an FRP pipe having yokes attached to the ends is known. For example, Japanese Unexamined Patent Publication No. 8-108495 discloses a propeller shaft 50, one end of which is shown in FIG. 6. The shaft 50 includes an FRP pipe 51 and metal yokes 52 attached to the ends of the pipe 51. The pipe 51 includes a helical layer 53 and hoop layers 54. The helical layer 53 extends in the longitudinal direction of the pipe 51. Reinforcing fibers of the helical layer 53 are angled by ±five to thirty degrees relative to the axis of the pipe 51. The hoop layers 54 are located radially inside the helical layer 53 at the ends of the pipe 51. Reinforcing fibers of the hoop layers 54 are angled by ±eighty to ninety degrees relative to the axis of the pipe 51. The hoop layers 54 are strong enough to bear a force by which the yokes 52 are force inserted into the ends of the pipe 51.

To increase the rigidity of an FRP pipe, the Vf is preferably raised. Also, increasing the Vf raises the coefficient of elasticity of the shaft, which increases the resonant frequency of the pipe. Therefore, an FRP pipe having a high Vf is suitable for a propeller shaft.

However, a higher Vf results in less resin between the helical layer 53 and the hoop layer 54, which is likely to cause delamination. Particularly, stress generated in the helical layer 53 is different from that in the hoop layer 54, which further promotes delamination. Therefore, an increased Vf reduces the durability of the ends of the FRP pipe 51.

SUMMARY OF THE INVENTION

Accordingly, it is an objective of the present invention to provide a durable fiber-reinforced plastic pipe that has improved rigidity and an improved coefficient of elasticity.

To achieve the foregoing and other objects and in accordance with the purpose of the present invention, a fiber-reinforced plastic pipe having a joint section formed in one end is provided. The joint portion is coupled to another member. The pipe includes a helical layer formed with a fiber. The fiber is wound at a winding angle that is equal to or less than forty-five degrees. The fiber volume fraction of the joint portion is lower than the fiber volume fraction of the remainder of the pipe.

The present invention may also be embodied in a method for manufacturing a fiber-reinforced plastic pipe having a joint section formed in one end and a body section joined to the joint section. The joint section is adapted to fit another member. The method includes winding a fiber impregnated with resin about a mandrel to form a helical layer, the winding angle of the fiber being equal to or less than forty-five degrees relative to the axis of the mandrel; winding an organic fiber about the helical layer at a winding angle that is substantially ninety degrees relative to the axis of the mandrel; and tensioning the fiber while the fiber is being wound such that the fiber volume fraction of the joint section is lower than the fiber volume fraction of the body section of the pipe.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1(*b*) is a partial cross-sectional view illustrating the pipe of FIG. 1 and a yoke attached to the pipe;

FIG. 5(*b*) is an end view showing the fibers of FIG. 5(*a*); and

DETAILED DESCRIPTION OF THE PREFERRED EMBODIMENTS

Figure 1A:
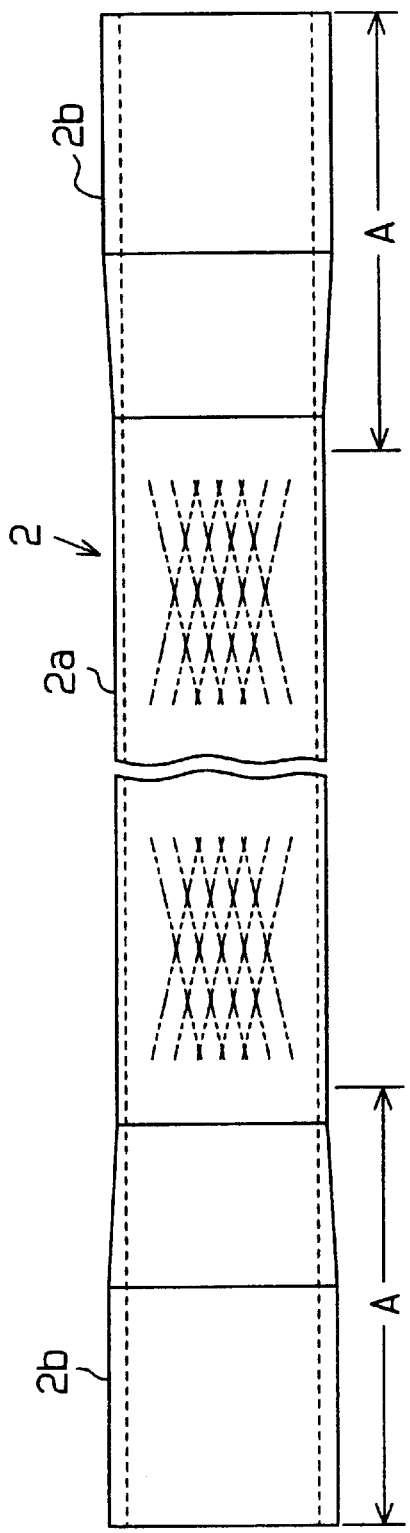
FIG. 1(*a*) is a diagrammatic view illustrating a fiber-reinforced plastic pipe according to a first embodiment of the present invention.

A fiber-reinforced plastic pipe 2 according to a first embodiment of the present invention will now be described with reference to FIGS. 1 to 4. The FRP pipe is used for a propeller shaft 1.

As shown in FIG. 1(*b*), the propeller shaft 1 includes the cylindrical FRP pipe 2 and two metal yokes 3 (only one is shown). The yokes 3 function as couplers. The pipe 2 has a main body 2a and two joint sections 2b. The joint sections 2b (only one is shown) are formed in the ends of the pipe 2. The proximal end of each yoke 3 is secured to one of the joint sections 2b by serrations formed in the yoke 3, which engage the FRP pipe 2. Holes 3a are formed in each yoke 3. A universal joint (for example, a cruciform joint) is coupled to the shaft 1 by the holes 3a.

The Vf of the joint sections 2b, or of sections A in FIG. 1(a), is lower than that of the rest of the pipe 2. In this embodiment, the Vf of the joint sections 2b is 60%, and the Vf of the remainder of the pipe 2 is 70%. The reinforcing fibers of the pipe 2 are carbon fibers. The matrix resin is epoxy resin.

Figure 1B:
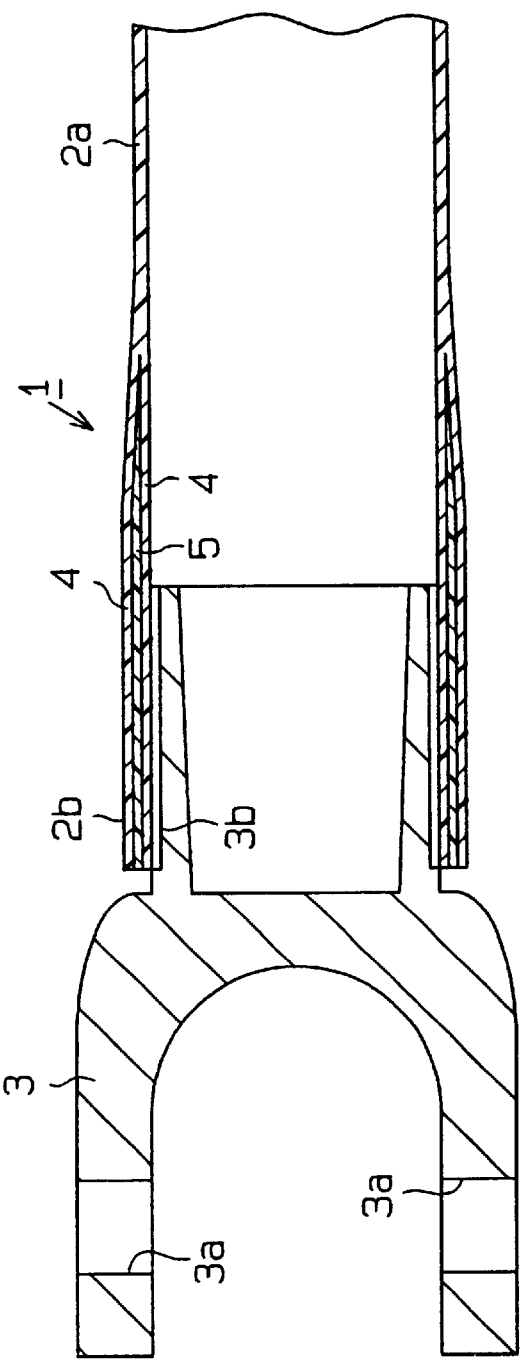

The FRP pipe 2 includes a helical fiber layer 4 and a hoop fiber layer 5. The layers 4, 5 are formed with bundles of reinforcing fibers. The bundle of the helical layer 4 is wound at a predetermined pitch and is inclined by a predetermined winding angle relative to the axis of the pipe 2. The winding angle of the bundle of each hoop layer 5 is approximately ninety degrees. The winding angle of the helical layer 4 is equal to or less than forty-five degrees to satisfy required bending, torsional and vibrating characteristics. In this embodiment, the winding angle of the helical layer 4 is ±ten degrees. The hoop layers 5 are formed only in the joint sections 2b of the pipe 2. As shown in FIG. 1(b), each hoop layer 5 is embedded in the helical layer 4. The helical layer 4 and the hoop layers 5 form a fiber lamination 32 as shown in FIG. 2.

Figure 2:
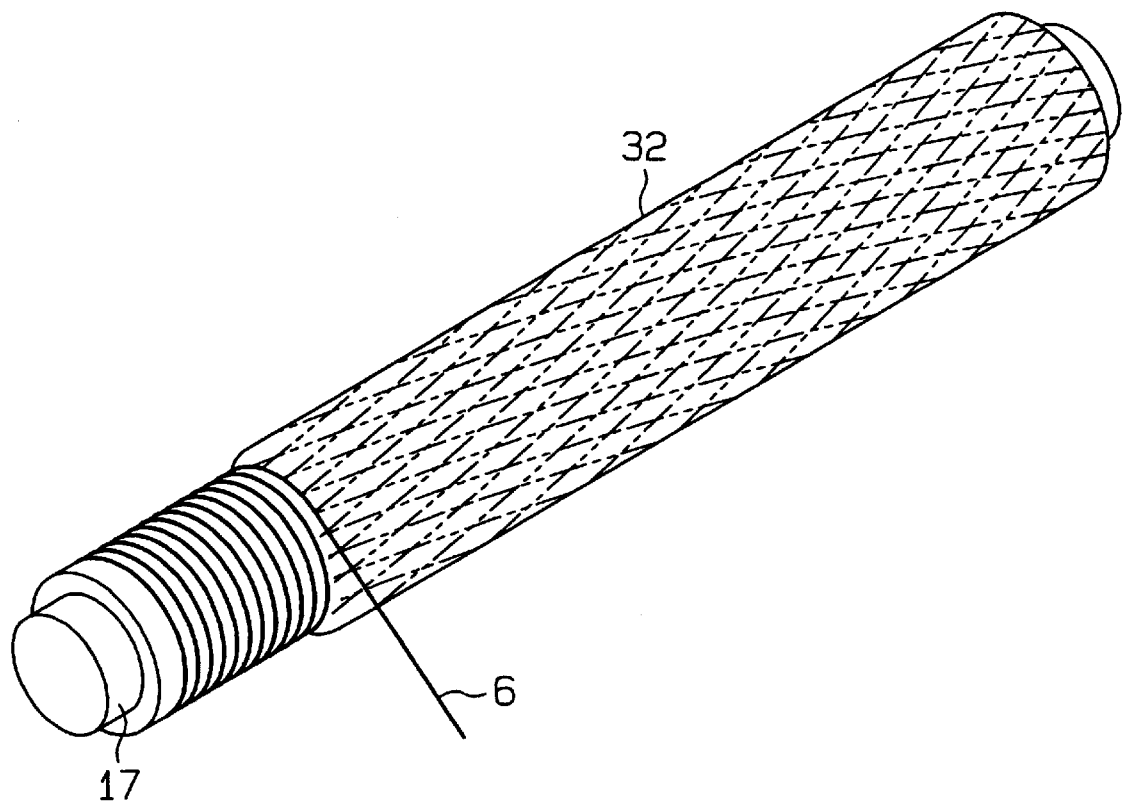
FIG. 2 is a perspective view illustrating a fiber being wound about a mandrel.

A lamination of an organic fiber 6 is formed about the lamination 32 as shown in FIG. 2. The lamination of the fiber 6 is extremely thin and is not illustrated in FIG. 1(b). The winding angle of the fiber 6 is approximately ninety degrees relative to the pipe axis. A part at which there are fewer layers of the fiber 6 is referred to as a low Vf portion. A part at which there are a greater number of layers of the fiber 6 is referred to as a high Vf portion. In this embodiment, a single layer of the fiber 6 is formed in the low Vf portion, two layers of the fiber 6 are formed in the high Vf portion. The fiber 6 is a heat-shrinkable thread such as a polyester thread.

Figure 4:
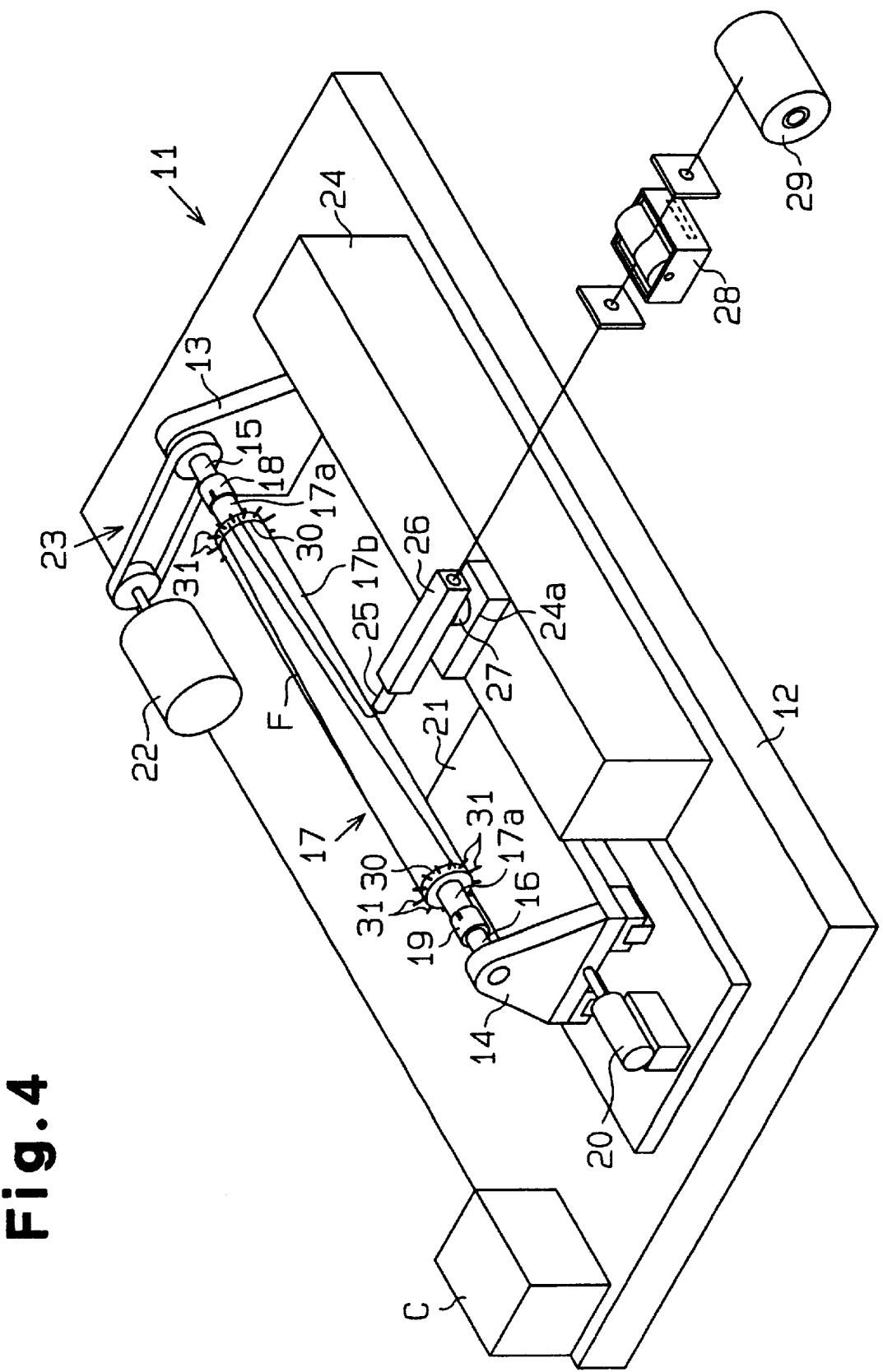
FIG. 4 is a perspective view illustrating a filament winding apparatus.

The pipe 2 is formed by a filament winding method. As shown in FIG. 4, a filament winding apparatus (FW apparatus) 11 includes first and second brackets 13, 14 located on a base plate 12. The brackets 13, 14 support rotary shafts 15, 16. The shafts 15, 16 extend in the longitudinal direction of the base plate 12. Chucks 18, 19 are attached to the distal ends of the shafts 15, 16, respectively. The chucks 18, 19 support shafts 17a of a mandrel 17. The first bracket 13 is fixed to the base plate 12 and the second bracket 14 is fixed to a plate 21. The plate 21 is moved in the longitudinal direction of the base plate 12 by a cylinder 20.

A motor 22 is located on the base plate 12. The motor 22 rotates in both forward and reverse directions. A belt mechanism 23 is located between a drive shaft of the motor 22 and the rotary shaft 15. The motor 22 rotates the rotary shaft 15.

A first actuator 24 is located on the base plate 12 and extends in the longitudinal direction of the base plate 12. The first actuator 24 includes a ball screw and a nut. The nut is moved by the ball screw. A movable body 24a is coupled to the nut. A second actuator 26 is coupled to the movable body 24a by an air cylinder 27. The second actuator 26 includes a feeder head 25 to guide a fiber bundle F. The bundle F is impregnated with resin.

The second actuator 26 is moved between a lifted position and a reference position by the air cylinder 27. When the second actuator 26 is at the reference position, the axis of the feeder head 25 is perpendicular to the axis of the mandrel 17. That is, the height of the feeder head 25 is the same as that of the mandrel axis. When the second actuator 26 is at the lifted position, the axis of the feeder head 25 is aligned with an upper tangent to the mandrel 17. The second actuator 26 moves the feeder head 25 in a direction perpendicular to the base plate 12.

The motor 22 and the first actuator 24 are synchronously controlled by a controller C. The rotary shaft 15 is rotated, and the feeder head 25 is moved for winding the bundle F about the mandrel 17. At this time, the winding angle of the bundle F is arbitrarily changed by adjusting the rotation speed of the rotary shaft 15 and the moving speed of the feeder head 25.

A resin tank 28 and a bobbin 29 are located adjacent to the base plate 12 at the opposite side of the first actuator 24 with respect to the motor 22. A reinforcing resin, which is the fiber bundle F, is fed from the bobbin 29 and is impregnated with resin in the resin tank 28. The bobbin 29 is attached to a shaft, which is rotated by a motor (not shown). The bundle F, the tension of which is adjusted by a tension adjuster (not shown), is supplied to the feeder head 25. The tension adjuster includes a tension bar, a guide roller, a weight and a motor. The tension bar is generally parallel to the bundle F. The guide roller engages the bundle F and is secured to the longitudinal center of the tension bar. The axis of the guide roller is generally perpendicular to the bundle F. The weight is attached to a distal end of the tension bar. The proximal end of the tension bar is pivotally supported. The motor pivots the tension bar to adjust the position of the guide roller. Accordingly, the tension of the bundle F is maintained in a predetermined range. Specifically, the position of the guide roller relative to the bundle F is detected by a rotational sensor, which detects the pivoting amount of the tension bar. The motor is actuated such that the guide roller applies a required tension to the bundle F. Thus, the pivoting motion of the tension bar prevents the bundle F from becoming loose.

The mandrel 17 includes a metal cylinder 17b. A shaft 17a extends from each end of the cylinder 17b. A detachable limit ring 30 is provided on each end of the cylinder 17b. Removable pins 31 are provided with a predetermined pitch between one another on each limit ring 30.

A method for manufacturing the FRP pipe 2 by using the FW apparatus 11 and the mandrel 17 will now be described.

First, the mandrel 17 is set between the chucks 18, 19. The distance between the chucks 18, 19 is adjusted by moving the support bracket 14 with the support plate 21. The end of the fiber bundle F is drawn from the feeder head 25 and is secured to one of the limit rings 30. The preparation is thus completed. At this time, the position of the feeder head 25 corresponds to the ring 30 to which the end of the bundle F is fixed.

The FW apparatus 11 is then activated. Specifically, the motor 22 rotates the mandrel 17 in one direction and the first actuator 24 reciprocates the feeder head 25 in the axial direction of the mandrel 17. The fiber bundle F is continuously drawn from the bobbin 29 and is impregnated with resin in the resin tank 28. The bundle F is then wound about the mandrel 17 through the feeder head 25. The amount of resin impregnated in the bundle F is greater than the amount that corresponds to a target Vf range of the low Vf portion.

After passing between a pair of adjacent pins 31, the bundle F is wound about the shaft 17a. The bundle F is repeatedly looped back around the pins 31 such that the angle of the bundle F relative to the axis of the mandrel 17 at the pins 31 is equal to a target angle. Accordingly, a fiber layer is formed on the mandrel 17.

The bundle F is wound about the mandrel 17 until the number of the fiber layers matches a predetermined number. Thereafter, the hoop layer 5 is formed at the each end of the cylinder 17b to form the joint sections 2b. The thickness of the hoop layers 5 is previously determined. Then, the bundle F is again helically wound about the entire mandrel 17, which forms the helical layer 4. The hoop layer 5 and the helical layer 4 form the fiber lamination 32.

Figure 3:
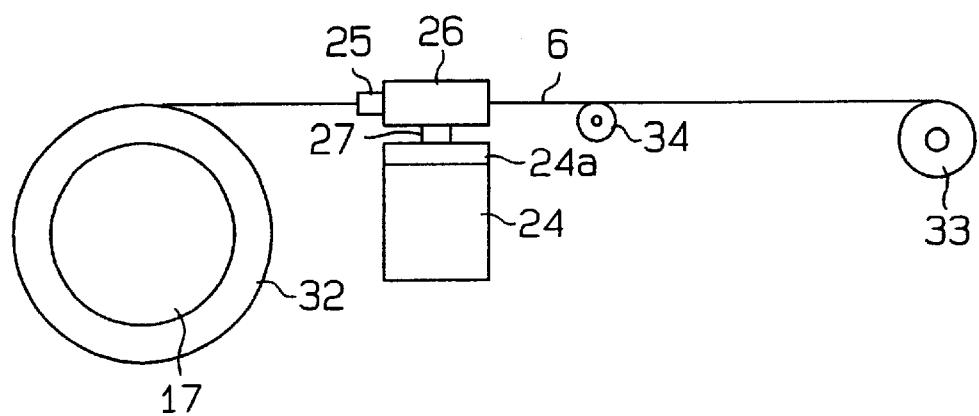
FIG. 3 is a diagrammatic side view showing the fiber of FIG. 2 being wounded on the mandrel.

Then the organic fiber 6 is wound about the lamination 32. The winding angle of the fiber 6 is approximately ninety degrees. The feeder head 25 of the FW apparatus 1 is used to wind the fiber 6. As shown in FIG. 3, the fiber 6 is drawn from a bobbin 33 and guided by the guide roller 34 to the feeder head 25. The bobbin 33 is supported by a support shaft (not shown). A permanent magnet is located between the support shaft and a bearing supporting the support shaft. The magnet applies resistance to the support shaft, which applies a predetermined tension to the fiber 6. The tension applied to the fiber 6 is adjustable. When the fiber 6 is being wound about the layer 32, the actuator 26 is at the lifted position and the fiber 6 is tangent relative to the layer 32. In FIG. 3, the scale of the mandrel 17 relative to the actuators 24, 26 is different from that in FIG. 4 for illustrative purposes.

The fiber 6 may be fed by a feeder head other than the feeder head 25.

As shown in FIG. 2, the fiber 6 is tightly wound about the layer 32 formed on the mandrel 17 from one end of the mandrel 17. Since the fiber 6 is continuously wound about the layer 32 from one end, excessive resin impregnated in the fiber bundle F is squeezed out. Also, air among the turns of the fiber 6 is removed. If the number of the layers of the fiber 6 is one and the fiber 6 is wound by a great force, the amount of squeezed resin is relatively great, which may hinder the winding of the fiber 6. However, in this embodiment, the number of layers of the fiber 6 is more than one, and the winding force is increased at every layer of the fiber 6. As a result, the excessive resin is gradually squeezed out. The winding of the fiber 6 is therefore not hindered. In FIG. 2, a space exists between each adjacent winding of the fiber 6. However, the turns of the fiber 6 substantially contact each other.

In this embodiment, two layers of the organic fiber 6 are formed. The first layer of the fiber 6 formed on the entire lamination 32. The second layer of the fiber 6 is formed on portions at which the Vf must be increased. The tension of the fiber 6 is adjusted by a tension adjuster. In this embodiment, the Vf of the main body 2a is 70%, and the Vf of the joint sections 2b is 60%. To obtain these Vf ratios, the tensile stress of the fiber 6 in the first layer is 1 kg/mm$^2$, and the tensile stress of the fiber 6 in the second layer is 5 kg/mm$^2$.

After winding the fiber 6, the mandrel 17 is removed from the chuck 18, 19. Then, the pins 31 are removed from the limit rings 30. The mandrel 17, together with the wound fibers 6, is put into a heating furnace and is heated in a predetermined temperature, which hardens the resin. The setting temperature depends on the type of the resin. For example, the setting temperature of epoxy resin is about 180 degrees centigrade. The FRP pipe 2 is hardened on the mandrel 17. After cooling the pipe 2, the ends of the pipe 2 are cut off at positions axially inside the location of the pins 31. The pipe 2 is then removed from the mandrel 17. In this manner, the shaft body of a propeller shaft 1 is manufactured.

A serrated portion 3b of each yoke 3 is inserted into the joint section 2b of the pipe 2. The yokes 3 are thus coupled to the pipe 2. The outer diameter of the proximal end of each yoke 3 is slightly greater than the inner diameter of each joint section 2b. Thus, when press fitted into the corresponding joint section 2b, each yoke 3 applies force to the joint sections 2b that tends to expand the joint sections 2b. However, the hoop layers 5 maintains the strength of the pipe 2 by resisting this force.

When the FRP pipe 2 is used as a vehicle propeller shaft 1, torque is applied to the joint sections 2b. If there is too little resin in the joint section 2b and in the portions adjacent to the joint sections 2b, delamination of the reinforcing fibers is likely to occur, which reduces the life of the shaft 2. If the overall Vf of the pipe 2 is lowered to obtain the sufficient amount of resin, the desired rigidity and coefficient of elasticity cannot be obtained. However, in this embodiment, the Vf of the pipe 2 is varied between the main body 2a and the joint sections 2b, which guarantees that enough resin exists in the joint sections 2b and that the main body 2a has the required coefficient of elasticity.

Experiments were performed to judge the likelihood of the delamination. In the experiments, the Vf in the joint sections 2b were varied. When the Vf was over 65% in the joint sections 2b, delamination was more likely to occur. Thus, the Vf in the joint sections 2b is preferably smaller than 65%. If carbon fiber is used for forming the pipe 2 by an ordinary filament winding method, the Vf is between 50% and 60%. Therefore, to facilitate manufacture, the Vf is preferably about 60%.

The embodiment of FIGS. 1(a) to 4 has the following advantages.

If the Vf of the main body 2a is increased for improving its rigidity and coefficient of elasticity, delamination is more likely to occur in the joint sections 2b. However, in this embodiment, the Vf of the joint sections 2b, which are coupled to the yokes. 3, is lower than the Vf of the remainder of the pipe (the main body 2a). Therefore, delamination is prevented and the durability of the pipe 2 is improved.

Since the Vf in the joint sections 2b is lower than 65% and the Vf of the remainder is at least 65%, the rigidity and coefficient of elasticity of the pipe 2 is improved compared to a FRP pipe of a normal Vf (less than 60%).

The layers of the organic fiber 6 are formed about the helical layer 4 of the pipe 2, and the winding angle of the layers of the fiber 6 is approximately ninety degrees. Therefore, the Vf of the pipe 2 is easily controlled to desired values by changing the winding tension of the fiber 6. Specifically, the Vf of the joint sections 2b is set lower and the Vf of the main body 2a is set higher.

The number of layers of the fiber 6 in the low Vf portion is less than that of the high Vf portion. The fiber 6 is wound about the lamination 32 to form the high Vf portion after the fiber 6 is wound about the lamination 32 to form the low Vf layer, which facilitates the manufacturing process.

When forming each layer of the fiber 6, the winding tension of the fiber 6 is constant, and the number of layers of the fiber 6 is one in the low Vr portion and is two in the high Vf portion. In other words, the number of the layers of the fiber 6 is minimum in the illustrated embodiment, which facilitates the manufacturing process.

The joint sections 2b are formed on the ends of the FRP pipe 2. Therefore, the pipe 2 can be used for shafts that must have a specific end characteristics to receive coupling members.

A heat shrinkable thread such a polyester thread is used as the organic fiber 6. When the matrix resin is hardened by heat, the fiber 6 is shrunk, which increases the Vf. Therefore, when the winding tension of the fiber 6 is relatively low, the Vf of the manufactured pipe 2 is increased.

It should be apparent to those skilled in the art that the present invention may be embodied in many other specific forms without departing from the spirit or scope of the invention. Particularly, it should be understood that the invention may be embodied in the following forms.

Figure 5A:
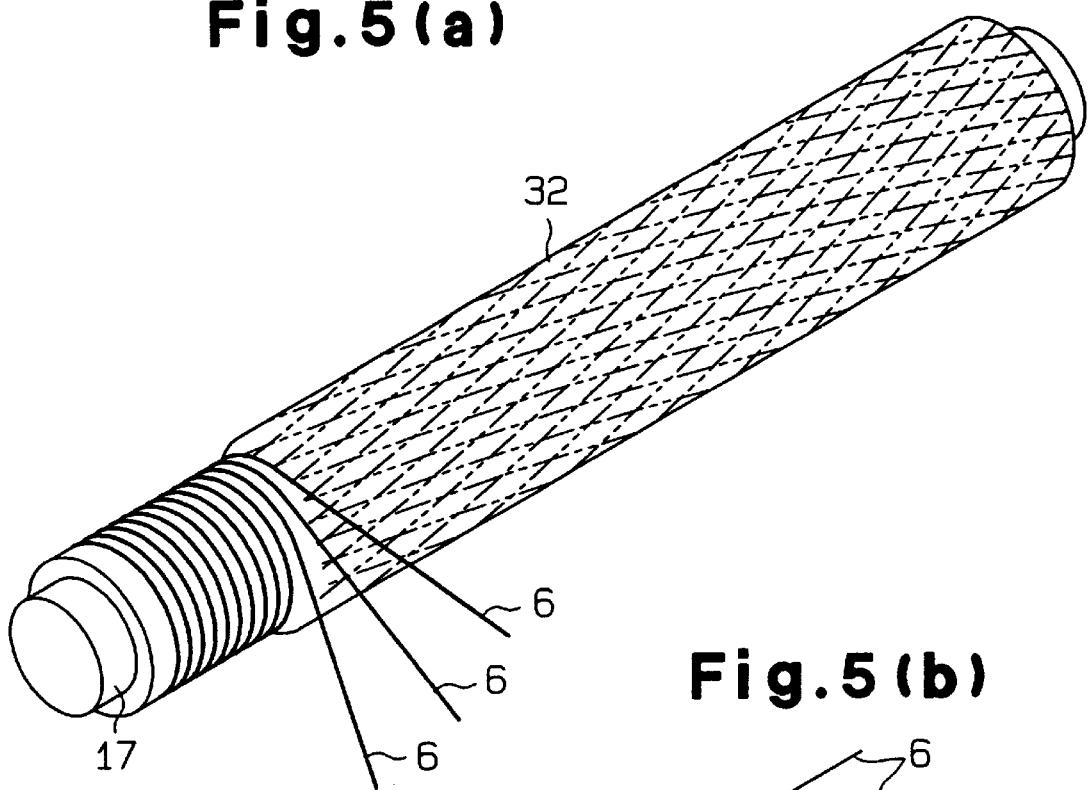
FIG. 5(*a*) is a perspective view illustrating fibers according to a second embodiment being wound about a mandrel.
Figure 5B:
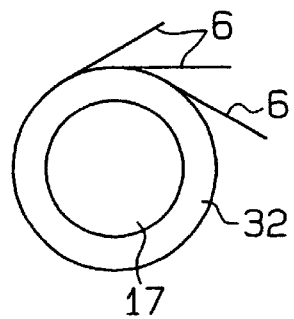
Figure 6:
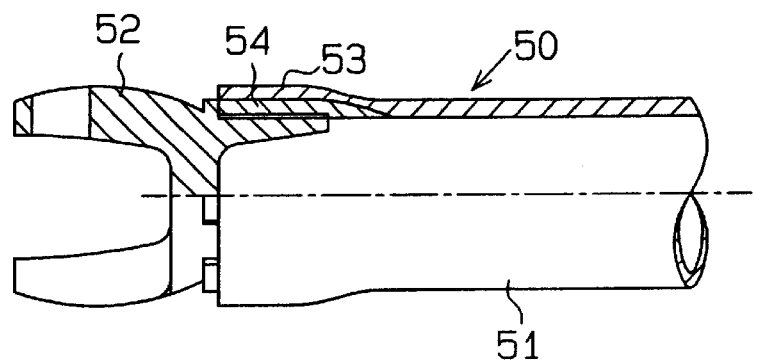
FIG. 6 is a partial cross-sectional view illustrating a prior art propeller shaft.

After forming the lamination 32 with the resin impregnated fiber bundle F, more than one fiber 6 may be simultaneously wound about the mandrel 17 as shown in FIGS. 5(a) and 5(b). The fibers 6 are interwound as shown, and the winding angles are substantially ninety degrees. The phases of the fibers 6 are varied in the circumferential direction of the mandrel 17. That is, the fibers 6 contact the layer 32 at different circumferential locations. In the embodiment of FIGS. 1(a) to 4, one fiber 6 is wound about the lamination 32, and the pitch between each adjacent winding of the fiber 6 is approximately equal to the width of the fiber 6. In the embodiment of FIGS. 5(a) and 5(b), the pitch of each fiber 6 is equal to a value computed by multiplying the pitch of the first embodiment by an integer, where the integer is the number of fibers 6. Specifically, the pitch of each fiber 6 is computed by the pitch of the first embodiment by the number of the fibers 6 (three in the FIGS. 5(a) and 5(b).

Since multiple fibers 6 are wound, the time required for forming the layers of the fibers 6 is significantly reduced to less than half of a case where a single fiber 6 is used. Also, since the circumferential phase of the fibers 6 are varied, the structure of the feeder heads are simple compared to that where there is no phase difference between the fibers 6. Also, the varied phases prevent the fibers 6 from interfering with each other and effectively squeeze the resin. The number of the fibers 6 may be two or more than three.

Three or more layers of the fiber 6 may be formed.

In the illustrated embodiments, the Vf of the pipe 2 distinctly changes at each border between the main body 2a and the joint section 2b. The pipe 2 may be formed such that the Vf continuously or discretely changes between each joint section 2b and the main body 2a. For example, two or more layers of the fiber 6 may be formed, and the first layer is wound about the entire layer 32 with a certain tension such that the Vf is relatively low. When the second layer is formed, the winding tension of the fiber 6 is discretely changed between the main body 2a and each joint section 2b. Compared to a shaft where the Vf is distinctly changed at the borders, the pipe 2 with a discretely changed Vf is more durable.

The Vf of the main body 2a need not be 70% as long as it is 65% or greater. The Vf of the joint sections Vf need not be 60% as long as it is less than 65%.

Only a single layer of the fiber 6 may be formed, and the Vf may be distinctly changed at the border between each joint section 2b and the main body 2a. In this case, when forming the lamination 32, the amount of resin impregnated in the fiber bundle F is adjusted such that the Vf of the main body 2a is slightly different from the Vf of the joint sections 2b. Thereafter, the fiber 6 is wound about the layer 32, and the winding tension of the wire 6 is different when the wire 6 is wound about the main body 2a from when the wire 6 is wound about the joint sections 2b.

The location of the hoop layer 5, which is embedded in the helical layer 4 in the illustrated embodiments, may be changed. For example, the hoop layers 5 may be formed about the helical layer 4. The number of the hoop layer 5 may be more than one in each joint sections 2b, and the number of the helical layer 4 in the joint section 2b may be increased accordingly. In this case, each hoop layer 5 is located between a pair of helical layers 4.

Instead of squeezing out resin by winding the resin 6, the amount of resin impregnated in the bundle F may be accurately controlled such that the Vf of the main body 2a and the Vf of the joint sections 2b are equal to predetermined target values.

Nylon 66 or nylon 6 may be used as the heat shrinkable fiber.

In the illustrated embodiments, the winding angle of the bundle F is constant. However, the winding angle of the bundle F may vary in each layer.

Thermosetting resins other than epoxy resin may be used as the matrix resin. For example, polyimide resin may be used. Alternatively, a thermoplastic resin having a high bending coefficient of elasticity, such as poly ether ether ketone may be used. However, for the propeller shaft 1, epoxy resin is preferred in view of cost and characteristics.

The pipe 2 of the illustrated embodiments may be used for manufacturing drive shafts other than vehicle propeller shafts 1. If the normal rotation speed of a shaft is low or if the required levels of torsional rigidity, heat resistance, and humidity resistance are lower than those of a vehicle propeller shaft 1, the reinforcing fiber may be glass fiber, aramide fiber or the mixture of both. Also, the fiber and the matrix resin may be a combination of carbon fiber and vinyl ester resin or a combination of carbon fiber and phenolic plastic. Vinyl ester resin and phenolic plastic are less expensive than epoxy resin. The costs are reduced accordingly.

The FRP pipe 2 may be used for any member that is joined to a coupler. For example, the pipe 2 may be used as the drum of a rotary press. Further, the pipe 2 may be used as a member having a single coupler attached to one end. Also, the pipe 2 may be used as a member that receives bending force, tension or pressure at the joint section.

The cross-section of the pipe 2 need not be circular. The cross-section may be elliptical as long as the reinforcing fiber and the fiber 6 are wound with a constant tension when the winding angle is substantially ninety degrees.

In the illustrated embodiments, the yokes 3 are coupled to the pipe 2 by serrations and press fitting. However, the yokes 3 may be secured to the pipe 2 by adhesive.

In the illustrated embodiments, in which the pipe 2 and other couplers are connected by serrations and press fitting, guide grooves may be formed in the wall of the joint sections 2b. The serrations of the coupler member engage with the guide grooves when the coupler is press fitted in the pipe 2.

Instead of the heat setting resin, an ultraviolet setting resin may be used as the matrix resin.

The present examples and embodiments are to be considered as illustrative and not restrictive and the invention is not to be limited to the details given herein, but may be modified within the scope and equivalence of the appended claims.

What is claimed is:

1. A fiber-reinforced plastic pipe having a joint section formed in one end, wherein the pipe includes a helical layer formed with a fiber, the fiber being wound at a winding angle that is equal to or less than forty-five degrees, and wherein the fiber volume fraction of the joint section is lower than the fiber volume fraction of the remainder of the pipe.

2. The fiber-reinforced plastic pipe according to claim 1, wherein the fiber volume fraction of the joint section is less than sixty-five percent, and the fiber volume fraction of the remainder of the pipe is equal to or more than sixty-five percent.

3. The fiber-reinforced plastic pipe according to claim 1, wherein the pipe includes layers of organic fibers about the helical layer, the organic fibers being wound at a winding angle that is substantially ninety degrees relative to the axis of the pipe, and wherein the number of the organic fiber layers in the joint section is less than the number of the organic fiber layers in the remainder of the pipe.

4. The fiber-reinforced plastic pipe according to claim 3, wherein the organic fiber is polyester.

5. The fiber-reinforced plastic pipe according to claim 3, wherein the organic fiber is one of a plurality of organic fibers that are simultaneously interwound, wherein the organic fibers are displaced from one another in the axial direction of the pipe and are each wound at a winding angle that is substantially ninety degrees.

6. The fiber-reinforced plastic pipe according to claim 1, wherein the joint section is one of two joint sections formed at the ends of the pipe.

7. The fiber-reinforced plastic pipe according to claim 1, wherein the pipe forms a propeller shaft.

8. The fiber-reinforced plastic pipe according to claim 1, wherein the pipe includes a hoop layer formed with a fiber, the fiber being wound at a winding angle that is substantially ninety degrees relative to the axis of the pipe, and wherein the hoop layer is located in the joint section and is embedded in the helical layer.

9. The fiber-reinforced plastic pipe according to claim 1, wherein the fiber volume fraction changes at a border between the joint section and the remainder of the pipe.

10. The fiber-reinforced plastic pipe according to claim 9, wherein the change of the fiber volume fraction is continuous.

11. The fiber-reinforced plastic pipe according to claim 9, wherein the change of the fiber volume fraction is discrete.

12. A method for manufacturing a fiber-reinforced plastic pipe having a joint section formed in one end and a body section joined to the joint section, the joint section being adapted to fit another member, the method comprising:

winding a fiber impregnated with resin about a mandrel to form a helical layer, the winding angle of the fiber being equal to or less than forty-five degrees relative to the axis of the mandrel;

winding an organic fiber about the helical layer at a winding angle that is substantially ninety degrees relative to the axis of the mandrel; and tensioning the organic fiber while the organic fiber is being wound such that the fiber volume fraction of the joint section is lower than the fiber volume fraction of the body section of the pipe.

13. The method according to claim 12, wherein the winding of the organic fiber includes:

winding a first layer of the organic fiber about the entire helical layer; and winding a second layer of the organic fiber on the body section.

14. The method according to claim 13, further comprising winding the second layer with greater tension in the fiber than when winding the first layer.

* * * * *

UNITED STATES PATENT AND TRADEMARK OFFICE
CERTIFICATE OF CORRECTION

PATENT NO.    : 6,350,204 B1                          Page 1 of 1
DATED         : February 26, 2002
INVENTOR(S)   : Yasui et al.

It is certified that error appears in the above-identified patent and that said Letters Patent is hereby corrected as shown below:

<u>Column 6,</u>
Line 37, please change "yokes. 3" to -- yokes 3, --.

Signed and Sealed this

Twenty-eighth Day of May, 2002

*Attest:*

*Attesting Officer*

JAMES E. ROGAN
*Director of the United States Patent and Trademark Office*